(12) United States Patent
Betush et al.

(10) Patent No.: US 11,685,534 B2
(45) Date of Patent: Jun. 27, 2023

(54) SYSTEM AND METHOD FOR DETERMINING THE REAL-TIME EFFECT OF ICE ACCUMULATION ON AIRCRAFT SURFACES ON ANGLE OF ATTACK DURING FLIGHT

(71) Applicant: Lockheed Martin Corporation, Bethesda, MD (US)

(72) Inventors: William Betush, Weatherford, TX (US); Russell Guy Torti, Southlake, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 388 days.

(21) Appl. No.: 16/989,475

(22) Filed: Aug. 10, 2020

(65) Prior Publication Data

US 2022/0041290 A1 Feb. 10, 2022

(51) Int. Cl.
| | | |
|---|---|---|
| *B64D 15/00* | (2006.01) | |
| *B64D 15/20* | (2006.01) | |
| *B64C 3/38* | (2006.01) | |
| *B64D 43/02* | (2006.01) | |

(52) U.S. Cl.
CPC .............. *B64D 15/20* (2013.01); *B64C 3/38* (2013.01); *B64D 43/02* (2013.01)

(58) Field of Classification Search
CPC ............ B64D 15/20; B64D 43/02; B64C 3/38
USPC .......................................................... 701/3
See application file for complete search history.

(56) References Cited

U.S. PATENT DOCUMENTS

| | | | |
|---|---|---|---|
| 4,628,736 | A | 12/1986 | Kirby et al. |
| 5,467,944 | A | 11/1995 | Luukkala |
| 6,320,511 | B1 | 11/2001 | Cronin et al. |
| 8,434,365 | B2 | 5/2013 | Bilgram et al. |

(Continued)

FOREIGN PATENT DOCUMENTS

| | | |
|---|---|---|
| CN | 2013 55244 | 12/2009 |
| CN | 2025 57799 | 11/2012 |

(Continued)

OTHER PUBLICATIONS

Eugene G. Hill, et al., "Aerodynamic Effects of Aircraft Ground Deicing/Anti-Icing Fluids," *Journal of Aircraft*, vol. 30, No. 1, Jan.-Feb. 1993, pp. 24-34.

(Continued)

*Primary Examiner* — Tyler J Lee
*Assistant Examiner* — Tiffany P Ohman
(74) *Attorney, Agent, or Firm* — Baker Botts L.L.P.

(57) ABSTRACT

A system includes a plurality of sensors along a surface of an airfoil operable to measure a first set of ice thickness values at a first time and a second set of ice thickness values at a second time. The system further includes a processor configured to determine a first plurality of lift calculation variables and a second plurality of lift calculation variables. The processor also generates a threshold angle of attack value and updates the threshold angle of attack value at the second time, based on one or more differences between the first and second sets of ice thickness values and the first and second plurality of lift calculation variables. The processor is further configured to send, to a display, based on the updated threshold angle of attack, one or more changes to flight data to adjust the actual angle of attack of the airfoil.

20 Claims, 3 Drawing Sheets

(56) References Cited

U.S. PATENT DOCUMENTS

| | | | |
|---|---|---|---|
| 8,907,798 B2 | 12/2014 | Meis et al. | |
| 9,555,894 B2 | 1/2017 | Botura et al. | |
| 9,703,293 B2 | 7/2017 | Leopold et al. | |
| 10,336,463 B2 | 7/2019 | Ribeiro et al. | |
| 2014/0253348 A1 | 9/2014 | Maeda et al. | |
| 2018/0321386 A1* | 11/2018 | Bosetti | B64D 15/20 |

FOREIGN PATENT DOCUMENTS

| | | |
|---|---|---|
| EP | 1 336 564 A2 | 8/2003 |
| EP | 3 136 197 A1 | 1/2017 |
| EP | 3 480 117 A1 | 8/2019 |

OTHER PUBLICATIONS

R. John Hansman, Jr., et al., "*Ultrasonic Techniques for Aircraft Ice Accretion Measurement*," https://ntrs.nasa.gov/search.jsp?R=19900011610 2020-04-12T01:26:12+00:00Z, N90-20926, pp. 43-53, Apr. 2020.

Patrick Veillette, "*Stall by Surprise: Aircraft's AOA May Not Be or Behave As You Believe.*", Nov. 19, 2019.

Extended European Search Report, Application No. 21189648.5-1010, dated Jan. 14, 2022.

\* cited by examiner

SYSTEM AND METHOD FOR DETERMINING THE REAL-TIME EFFECT OF ICE ACCUMULATION ON AIRCRAFT SURFACES ON ANGLE OF ATTACK DURING FLIGHT

TECHNICAL FIELD

This disclosure relates in general to aircraft flight monitoring, and more particularly to a system and method for determining the effect of ice accumulation on aircraft surfaces on angle of attack.

BACKGROUND

When the pitch of an aircraft differs greatly from its flight path to the point that a critical angle of attack is exceeded, the aircraft loses the lift necessary for flight and will stall. An airfoil has a limited range of angle of attack in which it performs effectively. The critical angle of attack of an airfoil, and accordingly the maximum lift of the airfoil, can be affected by a number of adverse conditions, such as the accumulation of ice on the airfoil surface. Current techniques and tools for taking into account the real-time effect of these conditions on the angle of attack at which an airfoil will stall while the airfoil is in flight may be limited.

SUMMARY OF THE DISCLOSURE

According to one embodiment, a system includes one or more memory units configured to store a data table. The data table includes at least one or more ice thickness values corresponding to a first type of aircraft and one or more lift calculation variables corresponding to the first type of aircraft. The system also includes an interface. The interface is operable to receive, from a plurality of sensors, a first set of ice thickness values corresponding to a first time. Each ice thickness value within the first set of ice thickness values corresponds to a thickness of ice at a position along a surface of an airfoil for each of a respective one of the plurality of sensors. The system also includes one or more processors communicatively coupled to the memory and the interface. The processors are operable to filter each ice thickness value within the first set of ice thickness values with digital signal processing. The processors are also operable to apply signal averaging for each ice thickness value within the first set of ice thickness values and to determine, based on a measured flight data, a first plurality of lift calculation variables. The first plurality of lift calculation variables comprises at least one or more values corresponding to an airspeed of the airfoil and one or more values corresponding to an altitude of the airfoil. The processors are further configured to compare at least the first set of ice thickness values with the first set of plurality of lift calculation variables against the data table and to generate, based on at least the first set of ice thickness variables and the first plurality of lift calculation variables, a threshold angle of attack value. The threshold value comprises a maximum angle of attack at which the airfoil will not stall. The interface is further operable to receive, from the plurality of sensors, a second set of ice thickness values corresponding to a second time. The one or more processors are further operable to filter each ice thickness value within the second set of ice thickness values with digital signal processing and to apply signal averaging for each ice thickness value within the second set of ice thickness values. The processors are further configured to determine, based on a measured flight data, a second plurality of lift calculation variables. The second plurality of lift calculation variables comprises at least one or more values corresponding to an airspeed of the airfoil and one or more values corresponding to an altitude of the airfoil. The processors also compare at least the second set of ice thickness values with the second plurality of lift calculation variables against the data table and update at the second time, based on one or more differences between the first and second sets of ice thickness values and the first and second plurality of lift calculation variables, the threshold angle of attack value. The processors also send, to a display, based on the updated threshold angle of attack, one or more changes to the flight data to adjust an actual angle of attack of the airfoil.

According to another embodiment, method executed by a computing system includes generating, by a plurality of sensors, a first set of ice thickness values corresponding to a first time, by measuring the thickness of ice with each of the plurality of sensors at a position along a surface of an airfoil. The method also includes determining, based on a measured flight data, a first plurality of lift calculation variables and generating, based on at least the first set of ice thickness variables and the first plurality of lift calculation variables, a threshold angle of attack value. The threshold value comprises a maximum angle of attack at which the airfoil will not stall. The method further includes generating a second set of ice thickness values and a second plurality of lift calculation variables corresponding to a second time and updating at the second time, based on one or more differences between the first and second sets of ice thickness values and the first and second plurality of lift calculation variables, the threshold angle of attack value. Lastly, the method includes sending, to a display, based on the updated threshold angle of attack, one or more changes to the flight data to adjust an actual angle of attack of the airfoil.

In a further embodiment, a system comprises a plurality of sensors operable to measure a first set of ice thickness values corresponding to a first time. Each sensor is configured to determine a thickness of ice at a position along a surface of an airfoil. The system further includes a processor configured to determine, based on a measured flight data, a first plurality of lift calculation variables. The processor is further configured to generate, based on at least the first set of ice thickness variables and the first plurality of lift calculation variables, a threshold angle of attack value. The threshold value comprises a maximum angle of attack at which the airfoil will not stall. The plurality of sensors are further operable to measure a second set of ice thickness values corresponding to a second time. The processor is also operable to determine a second plurality of lift calculation variables corresponding to a second time and to update at the second time, based on one or more differences between the first and second sets of ice thickness values and the first and second plurality of lift calculation variables, the threshold angle of attack value. The processor is further operable to send, to a display, based on the updated threshold angle of attack, one or more changes to the flight data to adjust an actual angle of attack of the airfoil.

Technical advantages of certain embodiments may include improving the performance, stability, and control of the aircraft and preventing ice and other contaminant-related stalls and crashes by providing real-time warnings during flight. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figures 1A, 1B:
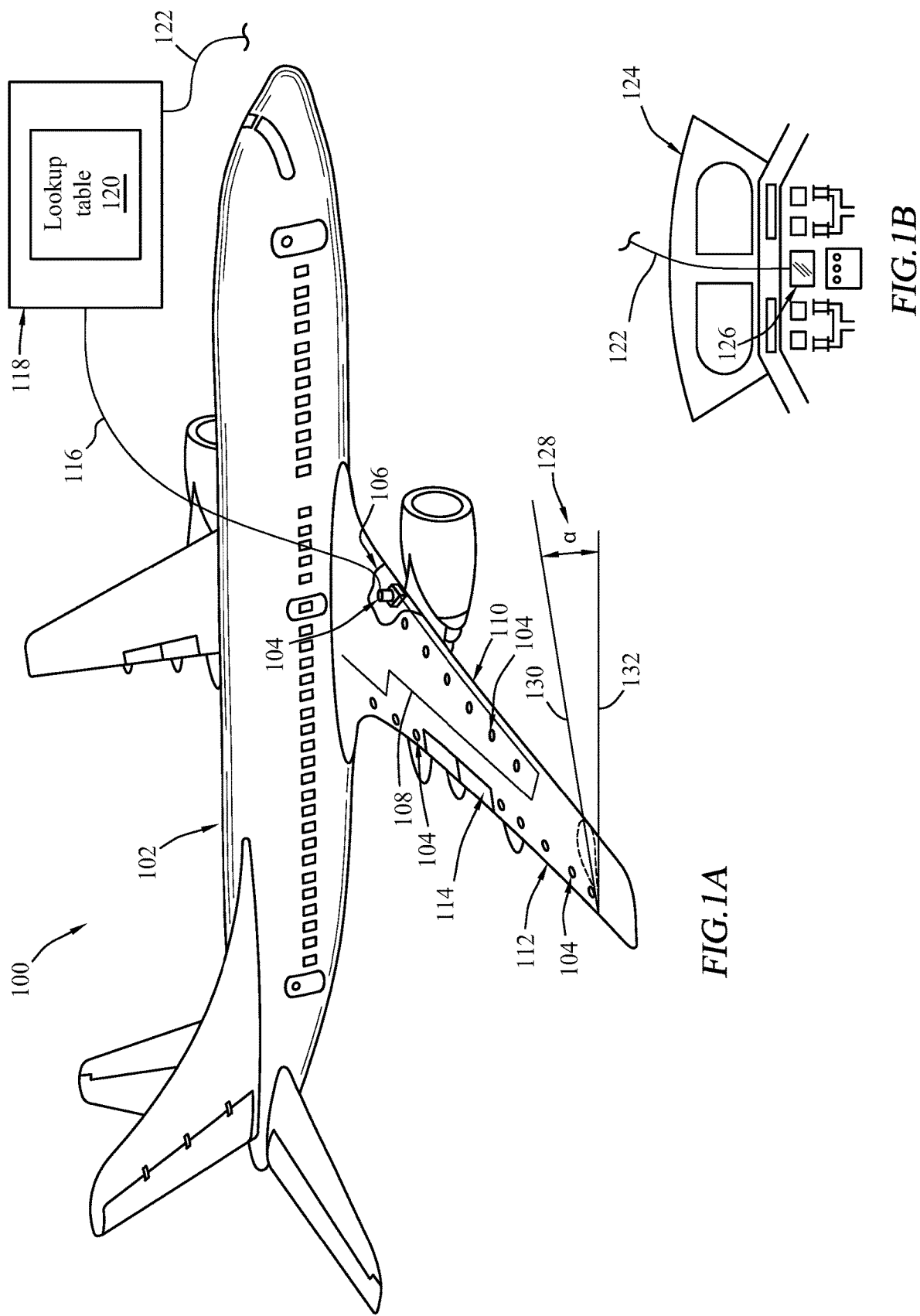
FIGS. 1A and 1B illustrate an aircraft equipped with a system for determining real-time ice accumulation on aircraft surfaces and a real-time threshold angle of attack, according to certain embodiments.

When the pitch of an aircraft differs greatly from its flight path to the point that a critical angle of attack is exceeded, the aircraft loses the lift necessary for flight and will stall. In other words, an aircraft may go into stall if the angle of attack of the airfoil increases to a point the lift generated by the airfoil during flight decreases. The term "lift," as used herein, is the force generated when air flows over an airfoil during flight. This force is directly opposite to the weight of the aircraft and keeps the aircraft in the air.

An airfoil has a limited range of angle of attack in which it performs effectively. The critical angle of attack of an airfoil, or the specific angle of attack above which the lift generated by the airfoil decreases, can be affected by a number of adverse conditions on the airfoil or in the environment. For instance, the accumulation of ice on the airfoil surface reduces maximum lift ability and correspondingly decreases the critical angle of attack above which the aircraft can potentially stall. Conventional ice detection systems alert aircraft operators to the presence of ice so that they can use learned skill to avoid stalling during flight or landing. As a result, the aircraft may aerodynamically stall at angles of attack that are far below what an aircraft operator might normally be considered dangerous, with little or no visual, tactile, or performance cues that would provide advanced warning to the aircraft operator. For example, a high angle of attack is commonly used during landing, so stall and subsequent loss of control can occur when a landing aircraft with icing on the wings unexpectedly exceeds the reduced critical angle. Accordingly, it would be advantageous to prevent unexpected stalls in icy conditions with a system configured to provide aircraft operators with real-time information needed to maintain the aircraft at or below the critical angle of attack during flight.

The teachings of this disclosure recognize the use of a device to generate one or more real-time threshold angle-of-attack references to avoid stall, based on real-time measurements of ice accumulation on an airfoil surface during flight. Using such a device may result in various benefits, including, but not limited to, improving the performance, stability, and control of the aircraft by providing one or more real-time critical angles of attack and/or real-time optimal angles of attack based on real-time ice accumulation data during flight. Moreover, ice and other airfoil-contaminant-related stalls and crashes may be prevented by providing a warning so that aircraft operators may act accordingly to correct the aircraft's angle of attack, based on one or more real-time threshold angle of attack values, before negative effects occur. Further advantages may include the use of one or more lookup tables with pre-modeled aerodynamic scenarios for particular aircraft to improve the operation of the underlying computer hardware of the system. In this manner, the underlying computer hardware would not be tasked with calculating particular flight models for the lookup table while in the air, thereby increasing in-flight computing efficiency and conserving the computational resources used by the system during flight. The following describes systems and methods for determining the real-time effect of ice accumulation on aircraft surfaces on angle of attack during flight for providing these and other desired features.

FIGS. 1A and 1B illustrate an aircraft 102 equipped with a system 100 for determining real-time ice accumulation on aircraft surfaces and real-time threshold angle of attack at which the airfoil will not stall while the airfoil is in flight, according to certain embodiments. As illustrated, system 100 includes plurality of sensors 104, first communications path 116, processing unit 118, lookup table 120, second communications path 122, and display unit 126.

In general, system 100 is configured to measure, at plurality of sensors 104, one or more sets of ice thickness values associated with ice accumulation 106 at particular positions along the surface of airfoil 108 of aircraft 102. The ice thickness data is transmitted via first communications path 116 to processing unit 118, which, compares the measured ice thickness values and a plurality of lift calculation variables against lookup table 120 to generate, in real-time, a value indicative of a threshold angle of attack at which the aircraft would not stall. According to particular embodiments, threshold angle of attack data may be used to suggest adjustments to angle 128 of aircraft 102, which may be transmitted via second communications path 122 to display unit 126 in cockpit 124. Accordingly, in some embodiments, system 100 may use real-time data regarding the surface condition of an airfoil to provide information on the behavior of the airfoil boundary layer under that condition, so that an aircraft operator may correct angle 128 of aircraft 102 to account for icy conditions and avoid stalls.

FIG. 1A depicts an example of aircraft 100. Aircraft 100 is an example of an aircraft in which system 100 may be implemented in accordance with an illustrative embodiment. Although this disclosure describes and depicts that aircraft 100 as being an airplane, this disclosure also contemplates that aircraft 100 could be any machine having an airfoil that is capable of flight, such as an unmanned aerial vehicle. As illustrated, aircraft 100 includes left airfoil (not pictured, right airfoil 108, and cockpit 124. Airfoil 108 may be an aircraft wing with leading edge 110 and trailing edge 112, according to particular embodiments. Airfoil 108 may have any flaps 114, slats, and/or other control surfaces fixed to the airfoil.

Angle 128 may represent the angle of attack of aircraft 100, in some embodiments. For instance, angle 128 may be the angle between chord line 130 of airfoil 108 and relative wind 130, as illustrated. Chord line 132, as illustrated in FIG. 1, is an imaginary straight line between trailing edge 112 of airfoil 108 and the center of curvature of leading edge 110 of the cross section of airfoil 108. Relative wind 130, as illustrated, is the vector representing the relative motion between aircraft 100 and the air.

As illustrated, ice accumulation 106 may form on the surface of airfoil 108. Although this disclosure describes and depicts an accumulation of ice, this disclosure also contemplates that airfoil 108 could be affected by formation of frost and/or liquid water films, battle damage, or any other boundary layer change of airfoil 108 that may be detected by one or more sensors. Ice accumulation 106 may be of any thickness that is aerodynamically significant.

As illustrated, plurality of sensors 104 is comprised of sensors arranged in a predefined array on the surface of airfoil 108. Any number of sensors necessary may be provided. Sensors within plurality of sensors 104 may be located on leading edge of 110 of airfoil 108, trailing edge 112 of airfoil 108, or any other location on airfoil or other portions of aircraft 102. Because ice may not be evenly distributed along the surface of airfoil 108 in all situations, each sensor within plurality of sensors 104 may be configured to determine a thickness of ice at its particular position along the surface of airfoil 108, according to certain embodiments. Each sensor in plurality of sensors 104 may determine ice thickness independently, such that the detection result may also be transmitted to processing unit 118 independently, in some embodiments. Each sensor within plurality of sensors 104 may be an ultrasonic measurement device, according to particular embodiments, or any other type of device able to measure any thicknesses of ice or any other surface disturbance on airfoil surface 108 in real time. Plurality of sensors 104 may further include, for example, without limitation, at least one of the following: angle of attack indicator, position sensor, temperature sensor, motion sensor, and other corresponding types of sensors. Plurality of sensors 104 may generate one or more sets of ice thickness values and may transmit ice thickness data to processing unit 118 via first communications path 116, as illustrated. Ice thickness data may be generated continuously, substantially in real time, in particular embodiments. A portion of the ice thickness data may be generated at set time intervals, in particular embodiments.

First communications path 116 facilitates communication between plurality of sensors 104 and processing unit 118, as illustrated. This disclosure contemplates first communications path 116 being any suitable means to facilitate communication between plurality of sensors 104 and processing unit 118. For example, first communications path 116 may provide communications through the use of wired, wireless, or Bluetooth links.

Processing unit 118 is configured to receive data from plurality of sensors 104 via first communications path 116, as illustrated. In the illustrated example of FIG. 1, processing unit 118 uses lookup table 120 to generate one or more real-time threshold angles of attack based on the ice thickness values received from plurality of sensors 104 and on a received plurality of lift calculation variables from measured flight data. The one or more threshold angle of attack values that may be generated by processing unit 118 may comprise the critical angle of attack and/or an optimized angle of attack, and/or any other angle of attack that would not cause aircraft 102 to stall, according to certain embodiments. Processing unit 118 transmits data to display unit 126 via second communications path 122, as illustrated. The data transmitted by processing unit 118 to display unit 126 may include the real-time threshold angle of attack value and/or suggested changes in angle 128 based on the threshold angle of attack value, in particular embodiments. Processing unit 118 will be explained further below in reference to FIG. 3.

Lookup table 120 is stored at processing unit 118, as illustrated. Lookup table 120 is calibrated for applications specific to the type of aircraft 102 in which system 100 is equipped, according to certain embodiments. Lookup table 120 may include at least one measured ice thickness value corresponding to the type of aircraft 102 and at least one lift calculation variable corresponding to the type of aircraft 102, in some embodiments. Lift calculation variables may include, without limitation, altitude, the physical characteristics of the aircraft, such as aircraft weight or comparable values, velocity, airspeed, and environmental conditions such as temperature. The lift calculation variables will be discussed further below in reference to FIG. 2. The aerodynamic scenarios of lookup table 120 may be pre-modeled in some embodiments. Although lookup table is illustrated as a single lookup table, this disclosure also contemplates that system 100 may include more than one lookup table 118.

Second communications path 122 facilitates communication between processing unit 118 and display unit 126. This disclosure contemplates first communications path 116 being any suitable means to facilitate communication between processing unit 118 and display unit 126. For example, second communications path 122 may provide communications through the use of wired, wireless, or Bluetooth links.

FIG. 1B depicts an example of display unit 126 located in cockpit 124. Display unit 126 may be configured to receive data from processing unit 118 via second communications path 122 and display said data to the aircraft operator. Display unit 126 may be a screen, a numbered indicator dial, a holographic display, a warning light, or any other means of conferring the requisite information to the aircraft operator, in some embodiments. Display unit 126 may display one or more numeric values, in some embodiments. Display unit 126 may issue a warning, such as a sound, a visual cue, or any other means of attracting attention of the aircraft operator, when angle 128 of aircraft 102 exceeds a threshold, according to particular embodiments.

In operation, system 100 may be configured to measure, by plurality of sensors 104, a set of ice thickness values for of ice accumulation 106 on the surface of airfoil 108. System 100 may be further configured to receive a plurality of lift calculation variables at processing unit 118, and, in some embodiments, may filter each ice thickness value with digital signal processing and/or apply signal averaging to each ice thickness value within the set of ice thickness values. During flight, system 100 may also generate, in real time at processing unit 118 with lookup table 120, a value indicative of a threshold angle of attack at airfoil 108 will not stall based on the set of ice thickness values and the plurality of lift calculation variables, according to certain embodiments. One or more threshold angles of attack and/or one or more suggested adjustments to angle 128 of aircraft 102 may be transmitted to display unit 126, according to certain embodiments. A warning signal may be generated if angle 128 is above the threshold angle of attack value. Suggested adjustments to angle 128 may be transmitted to an autopilot, in some embodiments. In response to receiving the suggested adjustments to actual angle of attack 128, the autopilot may be configured to automatically take actions to control a plurality of flight control devices, without having to enter an aircraft operator command, to prevent aircraft 102 from stalling. Autopilot can control at least one of the following: a rudder and slats among a plurality of control surfaces to prevent stalling of aircraft 102, in some embodiments. More specifically, the autopilot can increase the degree of deflection of rudders, for reducing the angle of attack of the aircraft 102. In addition, the autopilot may issue commands to extend the slats at leading edge 110 of airfoil 108 of the aircraft 102. The operation of system 100 will be discussed in more detail below in reference to FIG. 2.

Modifications, additions, or omissions may be made to the systems described herein without departing from the scope of the invention. For example, system 100 may include any number sensors within plurality of sensors 104. Furthermore, the embodiments recognize that not all sensors within plurality of sensors 104 may be affected by the same ice accumulation event due to the location of the sensors. For example, ice accumulation may not affect one or more of the sensors within plurality of sensors 104 because of the location of the sensors, and, in some embodiments, these unaffected sensors may not transmit data to processing unit 118. The components may be integrated or separated. Moreover, the operations may be performed by more, fewer, or other components.

Figure 2:
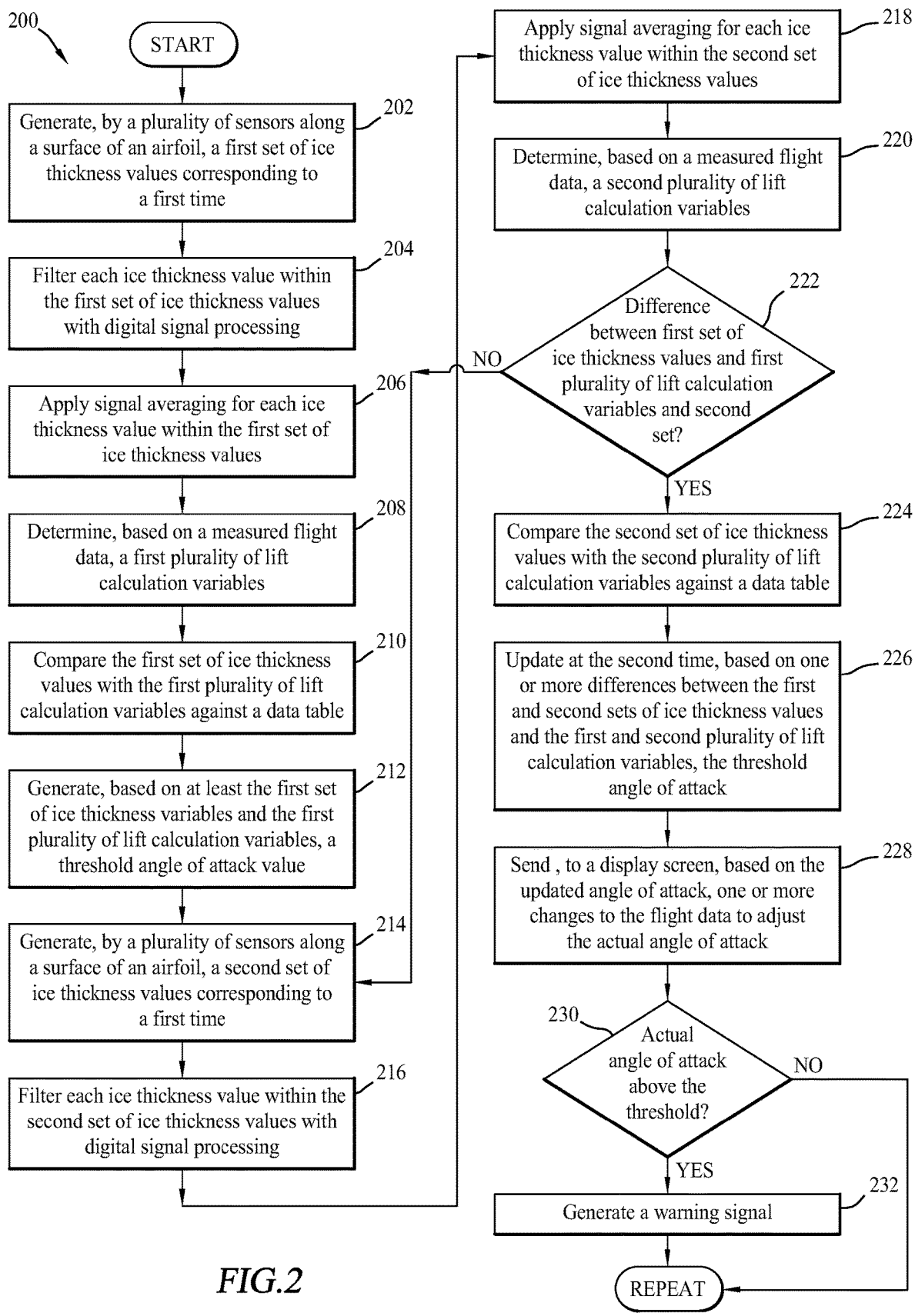
FIG. 2 is a flow chart illustrating a method for determining real-time ice accumulation on aircraft surfaces and a real-time threshold angle of attack with example system 100 of FIG. 1, according to certain embodiments.

FIG. 2 is a flow chart illustrating a method for determining real-time ice accumulation on aircraft surfaces and a real-time threshold angle of attack with example system 100 of FIG. 1, according to certain embodiments.

The method 200 begins at step 202, where plurality of sensors 104 along a surface of airfoil 108 generates a first set of ice thickness values corresponding to a first time, in some embodiments. Each sensor is configured to determine a thickness of ice accumulation 106 at a position along a surface of airfoil 108, according to particular embodiments.

At step 204, each ice thickness value within the first set of ice thickness values is filtered with digital signal processing, according to certain embodiments. In some embodiments, step 204 may occur at processing unit 118. Plurality of sensors 104 may be calibrated in conjunction with digital signal processing, in some embodiments. Filtering may be performed in the frequency domain by computing the Fourier transform of a signal and by applying filter functions, which suppress frequency components. This may result in a signal without any unwanted components.

At step 206, in some embodiments, signal averaging is applied to each ice thickness value within the first set of ice thickness values. Step 204 may occur at processing unit 118, in some embodiments. Signal averaging may be a digital technique for separating a repetitive signal from noise without introducing signal distortion. Signal averaging may be applied in the time domain and may increase the strength of a signal relative to noise that is obscuring it, according to certain embodiments. By averaging a set of replicate measurements, the signal-to-noise ratio may be increased. The signal-to-noise ratio may be increased in proportion to the number of measurements taken, in some embodiments.

At step 208, processor 118 determines, based on measured flight data, a first plurality of lift calculation variables, in some embodiments. Lift calculation variables may comprise, without limitation, plane type, altitude, airspeed, velocity, environmental temperature, static pressure, aircraft size, aircraft shape, aircraft weight, aircraft wing profile or any suitable value used for calculating lift. Altitude of aircraft 100 may be collected by a global positioning system, in some embodiments. The airspeed may be detected by a Pitot tube, and the outside altitude information may be detected by a global positioning system, in some embodiments. The factors described are intended only to be used as examples of certain types of factors among a variety of lift calculation variables that may affect the lift generated by aircraft 102. These examples are not intended to limit or determine lift calculation variables that may be determined by processing unit 118.

At step 210, the first set of ice thickness values and the first plurality of lift calculation variables is compared against lookup table 118, according to certain embodiments.

At step 212, a threshold angle of attack value is generated, based on at least the first set of ice thickness variables and the first plurality of lift calculation variable, in some embodiments. The threshold angle of attack value may be the critical angle, or maximum angle of attack value at which the airfoil will not stall, given the current state of the aircraft, according to particular embodiments. Rather than or in addition to the threshold angle of attack output may be exact value for the optimum angle of attack that would compensate for the particular thickness of ice on the wing, in some embodiments. This optimum value may be based on, without limitation, stall angle and lift coefficient, according to certain embodiments. The updated threshold angle of attack value may be any value at which aircraft 102 will not stall. The threshold value may be a default setpoint included in system 100 or may be input and/or updated by a third party (e.g., manufacturer, user, or maintenance group). System 100 may take into account changes in the state of the aircraft 100 during flight to update, in real time, the threshold angle of attack value in relation to the thickness of accumulated ice 106, in some embodiments.

At step 214, plurality of sensors 104 generates a second set of ice thickness values corresponding to a second time, according to certain embodiments. Step 204 may occur at processing unit 118, in some embodiments.

At step 216, each ice thickness value within the second set of ice thickness values is filtered with digital signal processing, according to certain embodiments.

At step 218, signal averaging is applied to each ice thickness value within the second set of ice thickness values, in some embodiments. Step 204 may occur at processing unit 118, in certain embodiments.

At step 220, processor 118 determines, based on measured flight data, a second plurality of lift calculation variables, in some embodiments.

At step 222, processing unit 118 determines whether there is a difference between the first set of ice thickness values and first plurality of lift calculation variables and the second set of ice thickness values and second set of lift calculation variables, in some embodiments. If processing unit 118 determines that there is not a difference between the first set of ice thickness values and first plurality of lift calculation variables and the second set of ice thickness values and second set of lift calculation variables, the method returns to step 214. If processing unit 118 determines that there is a difference between the first set of ice thickness values and first plurality of lift calculation variables and the second set of ice thickness values and second set of lift calculation variables, the method continues to step 224.

At step 224 the second set of ice thickness values and the second plurality of lift calculation variables is compared against lookup table 120, according to certain embodiments.

At step 226, a threshold angle of attack value is updated, based on one or more differences between the first and second sets of ice thickness values and the first and second plurality of lift calculation variables, in some embodiments. The updated threshold angle of attack value may represent the updated critical angle, or maximum angle of attack value at which the airfoil will not stall, given the current state of the aircraft, according to particular embodiments. The updated threshold angle of attack output may be exact value for the optimum angle of attack that would compensate for the particular thickness of ice on the wing, in some embodiments. This optimum value may be based on, without limitation, stall angle and lift coefficient, in some embodiments. The updated threshold angle of attack value may be any value at which aircraft 102 will not stall.

At step 228, one or more changes to the flight data, based on the updated angle of attack, are sent to display unit 126 to adjust actual angle of attack 128. Angle 128 may be measured using the angle of an indicator vane sensor, in some embodiments. Real-time suggested changes in flight data may be utilized by the aircraft operator or by an autopilot system during flight for improved overall flight safety, according to some embodiments. In response to receiving the suggested adjustments to actual angle of attack 128, the autopilot may be configured to automatically take actions to control a plurality of flight control devices, without having to prevent aircraft 102 from stalling, in some embodiments. The autopilot can control at least one of the following: a rudder and slats among a plurality of control surfaces to prevent stalling of aircraft 102, in some embodiments. More specifically, the autopilot can increase the degree of deflection of rudders, for reducing the angle of attack of the aircraft 102. In addition, the autopilot may issue commands to extend the slats at leading edge 110 of airfoil 108 of the aircraft 102.

At step 230, processing unit 118 determines whether angle 128 is above the updated threshold angle of attack value, in some embodiments. If at step 230 processing unit 118 determines that angle 128 is above the updated threshold angle of attack value, the method continues to step 232. If at step 230 processing unit 118 determines that angle 128 is not above the updated threshold angle of attack value, the method repeats, beginning at step 202.

At step 232, a warning signal is generated, according to particular embodiments. A warning signal may be based on the impact real-time ice accumulation 106 on actual angle of attack 128, according to lookup table 120, and may indicate a potential stall condition, in some embodiments. For instance, a warning signal may be generated when, for example, at least angle 128 of aircraft 102 is greater than the threshold angle of attack value. Display unit 126 may notify the aircraft operator in cockpit 124 that aircraft 102 has approached a threshold angle of attack based on ice thickness during flight, in certain embodiments. The warning signal from display 126 may be generated in such a way that it will be detected by the operator of the aircraft 100. For instance, warning signal may be at least one of an audible alert emanating from display unit 126, a visual indicator on display unit 126 in cockpit 124, and/or a tactile alert. A visual indicator may include, for example, at least one of the following: flashing colors, bold, font change, animation, flashing numbers, flashing lights, or some other appropriate type of indicator. The audible alert may include, for example, without limitation, a tone, a verbal message, or some other appropriate type of audible alert. A tactile alert can be, for example, without limitation, a command that transmits to a device attached a control handle in cockpit 124 and is configured to shake or vibrate the control handle in response to receiving a signal to generate a warning signal.

Modifications, additions, or omissions may be made to method 200 described herein without departing from the scope of the invention. For example, the steps may be combined, modified, or deleted where appropriate, and additional steps may be added. Additionally, the steps may be performed in any suitable order without departing from the scope of the present disclosure. While discussed as various components of system 100 performing the steps, any suitable component or combination of components of system 100 may perform one or more steps of the method.

Figure 3:
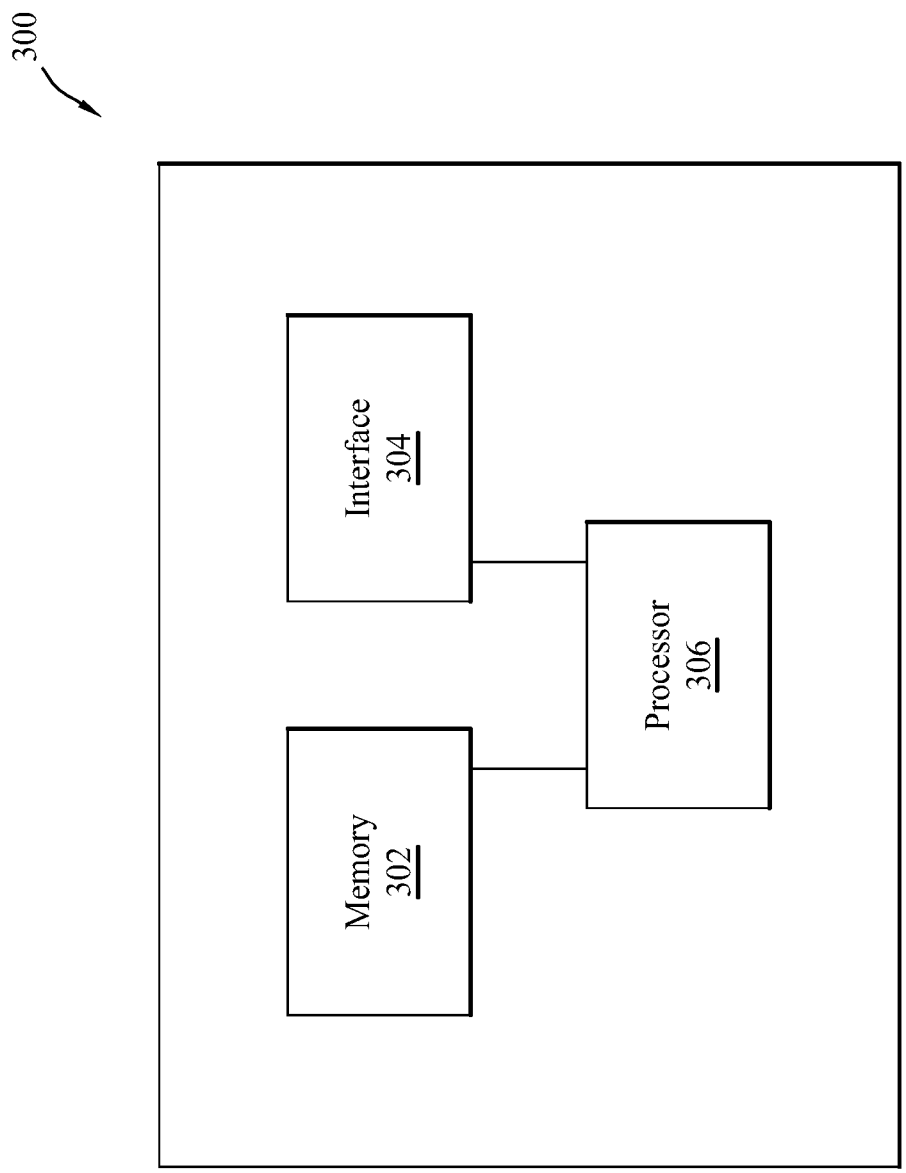
FIG. 3 illustrates an example computer system where particular embodiments of the disclosure may be implemented.

FIG. 3 illustrates an example of a computer system where particular embodiments of the disclosure may be implemented. Processing unit 118 of FIG. 1 may be or comprise computer system 300, according to certain embodiments of the present disclosure. Computer system 300 may comprise one or more interfaces 304, memory 302, and one or more processors 306. Although this disclosure describes and illustrates a particular computer system 300 having a particular number of particular components in a particular arrangement, this disclosure contemplates the computer system 300 having any suitable number of any suitable components in any suitable arrangement.

Interface 304 may comprise hardware and/or software. Interface 304 receives input (e.g., sensor data or system data), sends output (e.g., instructions), processes the input and/or output, and/or performs other suitable operation. As an example, interface 304 receives information from plurality of sensors 104 of FIG. 1, such as a set of ice thickness values associated with the surface of airfoil 108. Interface 304 receives one or more generated threshold angle of attack values and/or one or more suggested adjustments to angle 128 of aircraft 102 from processor 306 and sends the data to display 126, in some embodiments. Interface 304 may include one or more interfaces 304, where appropriate. Although this disclosure describes and illustrates a particular interface, this disclosure contemplates any suitable interface.

Memory (or memory unit) 302 may store information. As an example, a memory may store lookup table 120 of FIG. 1. Memory 302 may comprise one or more non-transitory, tangible, computer-readable, and/or computer-executable storage media. Examples of memory 302 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or any other suitable other computer-readable storage medium or a combination of these devices.

Processor 306 may be communicatively coupled to one or more components of computer system 300, including memory 302 and interface 304, in some embodiments. Processor 306 may include any suitable combination of hardware and software implemented in one or more modules to execute instructions and manipulate data to perform some or all of the described functions of processing unit 118. Processor 306 may include, for example, one or more computers, one or more central processing units (CPUs), one or more microprocessors, one or more applications, one or more application specific integrated circuits (ASICs), one or more field programmable gate arrays (FPGAs), and/or other logic, in some embodiments. Processor 306 may generate, in real time while the airfoil is in flight, a threshold angle of attack value at which airfoil 108 of FIG. 1 will not stall, based on at least the set of ice thickness values and the plurality of lift calculation variables received at processing unit 118, by comparing the measured ice thickness values and the plurality of lift calculation variables against lookup table 120 that may be stored in memory 302, according to certain embodiments.

Modifications, additions, or omissions may be made to the systems described herein without departing from the scope of the invention. For example, system 300 may include any number of processors 306, memory units 302, and/or interfaces 304. The components may be integrated or separated. Moreover, the operations may be performed by more, fewer, or other components.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
   a computer memory configured to store a data table, the data table comprising at least one or more ice thickness values corresponding to a first type of aircraft and one or more lift calculation variables corresponding to the first type of aircraft;
   an interface, the interface operable to receive, from a plurality of sensors, a first set of ice thickness values corresponding to a first time, each ice thickness value within the first set of ice thickness values corresponding to a thickness of ice at a position along a surface of an airfoil for each of a respective one of the plurality of sensors;
   one or more processors communicatively coupled to the computer memory and the interface, the one or more processors operable to:
      filter the each ice thickness value within the first set of ice thickness values with digital signal processing;
      apply signal averaging for each ice thickness value within the first set of ice thickness values;
      determine, based on a measured flight data, a first plurality of lift calculation variables, wherein the lift calculation variables comprises a value corresponding to an airspeed of the airfoil and a value corresponding to an altitude of the airfoil;
      compare at least the first set of ice thickness values with the first set of plurality of lift calculation variables against the data table; and
      generate, based on at least the first set of ice thickness variables and the first plurality of lift calculation variables, a threshold angle of attack value;
   the interface further operable to receive, from the plurality of sensors, a second set of ice thickness values corresponding to a second time;
   the one or more processors further operable to:
      filter the each ice thickness value within the second set of ice thickness values with the digital signal processing;
      apply the signal averaging for each ice thickness value within the second set of ice thickness values;
      determine, based on the measured flight data, a second plurality of lift calculation variables;
      compare at least the second set of ice thickness values with the second plurality of lift calculation variables against the data table;
      update at the second time, based on one or more differences between the first and second sets of ice thickness values and the first and second plurality of lift calculation variables, the threshold angle of attack value; and
      send, to a display, based on the updated threshold angle of attack, one or more changes to the flight data to adjust an actual angle of attack of the airfoil.

2. A method comprising, by a computing system:
   generating, by a plurality of sensors, a first set of ice thickness values corresponding to a first time, by measuring a thickness of ice with each of the plurality of sensors at a position along a surface of an airfoil;
   determining, based on a measured flight data, a first plurality of lift calculation variables;
   generating, based on at least the first set of ice thickness variables and the first plurality of lift calculation variables, a threshold angle of attack value;
   generating a second set of ice thickness values and a second plurality of lift calculation variables corresponding to a second time;
   updating at the second time, based on one or more differences between the first and second sets of ice thickness values and the first and second plurality of lift calculation variables, the threshold angle of attack value; and
   sending, to a display, based on the updated threshold angle of attack, one or more changes to the flight data to adjust an actual angle of attack of the airfoil.

3. The method of claim 2, wherein the first plurality of lift calculation variables comprises at least one or more values corresponding to an airspeed of the airfoil.

4. The method of claim 2, wherein generating the threshold angle of attack value comparing the first set of ice thickness values and the first plurality of lift calculation variables against a stored data table, the stored table comprising at least one or more ice thickness values corresponding to a first type of aircraft and one or more lift calculation variables corresponding to the first type of aircraft.

5. The method of claim 2, wherein the threshold angle of attack value is a critical angle of attack.

6. The method of claim 2, further comprising filtering, with digital signal processing, each ice thickness value within the first set of ice thickness values.

7. The method of claim 2, further comprising applying signal averaging to each ice thickness value within the first set of ice thickness values.

8. The method of claim 2, wherein each sensor within the plurality of sensors provides the first set of ice thickness values using wireless communication.

9. The method of claim 2, wherein the plurality of sensors is comprised of ultrasonic sensors.

10. The method of claim 2, further comprising:
    determining that the actual angle of attack of the airfoil is above the threshold angle of attack value; and
    in response to determining that the actual angle of attack is above the threshold angle of attack value, generating a warning signal.

11. A system comprising:
    a plurality of sensors operable to measure a first set of ice thickness values corresponding to a first time, wherein each sensor is configured to determine a thickness of ice at a position along a surface of an airfoil;
    a processor, the processor configured to:

determine, based on a measured flight data, a first plurality of lift calculation variables;

generate, based on at least the first set of ice thickness variables and the first plurality of lift calculation variables, a threshold angle of attack value;

the plurality of sensors further operable to measure a second set of ice thickness values corresponding to a second time;

the processor further operable to:

determine a second plurality of lift calculation variables corresponding to the second time;

update at the second time, based on one or more differences between the first and second sets of ice thickness values and the first and second plurality of lift calculation variables, the threshold angle of attack value; and send, to a display, based on the updated threshold angle of attack, one or more changes to the flight data to adjust an actual angle of attack of the airfoil.

12. The system of claim 11, wherein the first plurality of lift calculation variables comprises at least one or more values corresponding to an airspeed of the airfoil.

13. The system of claim 11, wherein the processor is further configured to compare the first set of ice thickness values and the first plurality of lift calculation variables against a stored data table, the stored table comprising at least one or more ice thickness values corresponding to a first type of aircraft and one or more lift calculation variables corresponding to the first type of aircraft.

14. The system of claim 11, wherein the threshold angle of attack value is a critical angle of attack.

15. The system of claim 11, wherein each ice thickness value within the first set of ice thickness values is filtered with digital signal processing.

16. The system of claim 11, wherein signal averaging is applied to each ice thickness value within the first set of ice thickness values.

17. The system of claim 11, wherein each sensor within the plurality of sensors provides the first set of ice thickness values using wireless communication.

18. The system of claim 11, wherein the plurality of sensors is comprised of ultrasonic sensors.

19. The system of claim 11, the processor further operable to:

determine that the actual angle of attack of the airfoil is above the threshold angle of attack value; and in response to determining that the actual angle of attack is above the threshold angle of attack value, generate a warning signal.

20. The system of claim 19, wherein the warning signal comprises a visual indicator in an aircraft cockpit.

* * * * *